United States Patent
Rai et al.

(10) Patent No.: US 12,536,573 B2
(45) Date of Patent: Jan. 27, 2026

(54) SYSTEMS AND METHODS FOR EVENT DETECTION AND RELATION TO CATALOG ITEMS

(71) Applicant: Walmart Apollo, LLC, Bentonville, AR (US)

(72) Inventors: Himanshu Rai, Bengaluru (IN); Tuhin Bhattacharya, Kolkata (IN); Raviteja Uppalapati, Sunnyvale, CA (US); Diksha Manchanda, New Delhi (IN); Samrat Kokkula, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 361 days.

(21) Appl. No.: 17/588,957

(22) Filed: Jan. 31, 2022

(65) Prior Publication Data

US 2023/0245195 A1     Aug. 3, 2023

(51) Int. Cl.
*G06Q 30/0601*     (2023.01)

(52) U.S. Cl.
CPC ..... *G06Q 30/0625* (2013.01); *G06Q 30/0603* (2013.01)

(58) Field of Classification Search
CPC . G06Q 30/0603; G06Q 30/0623–0629; G06Q 30/0601–0643; G06Q 50/01; G06Q 30/014; G06Q 30/0637
See application file for complete search history.

(56) References Cited

U.S. PATENT DOCUMENTS

| | | | |
|---|---|---|---|
| 8,412,557 B1* | 4/2013 | Lloyd | G06Q 30/0631 |
| | | | 705/7.29 |
| 10,410,125 B1 | 9/2019 | Finkelstein et al. | |
| 10,621,261 B2 | 4/2020 | Deng | |
| 10,922,744 B1* | 2/2021 | Mahajan | G06T 7/70 |
| 11,126,678 B2 | 9/2021 | David | |
| 11,205,183 B1* | 12/2021 | Greve | G06Q 30/0623 |
| 11,972,424 B1 | 4/2024 | Grudetskyi | |

(Continued)

OTHER PUBLICATIONS

Feldman, R. "Techniques and applications for sentiment analysis." Communications of the ACM. vol. 56, No. 4, pp. 82â89. https://doi.org/10.1145/2436256.2436274 (Year: 2013).*

(Continued)

*Primary Examiner* — Kelly S. Campen
*Assistant Examiner* — Katherine A Barlow
(74) *Attorney, Agent, or Firm* — Fitch, Even, Tabin & Flannery LLP

(57) ABSTRACT

In some embodiments, apparatuses and methods are provided herein useful for event detection relative to catalog items available for commercial sale. In some embodiments, there is provided a system for event detection relative to catalog items available for commercial sale including an interface; a memory; and the first control circuit. The first control circuit configured to execute the computer-implemented code to: receive event data corresponding to one or more events referred to in one or more online sources; determine a corresponding score for each of the event data based on a relative level of negativity; identify one or more topics and key phrases of one or more of the event data having at least a specified score; identify one or more catalog items that have a similarity to the one or more topics and key phrases; and output an indication.

18 Claims, 6 Drawing Sheets

(56) References Cited

U.S. PATENT DOCUMENTS

| | | | | |
|---|---|---|---|---|
| 2013/0103624 | A1* | 4/2013 | Thieberger | G06N 20/00 706/12 |
| 2014/0337247 | A1* | 11/2014 | Stephens | G06Q 30/00 705/343 |
| 2015/0112753 | A1 | 4/2015 | Suvarna | |
| 2017/0287023 | A1* | 10/2017 | Koch | G06Q 30/0601 |
| 2018/0247189 | A1* | 8/2018 | Adel | G06Q 30/0269 |
| 2019/0073592 | A1* | 3/2019 | Luo | G06N 3/084 |
| 2019/0080207 | A1* | 3/2019 | Chang | G06F 16/7837 |
| 2020/0097809 | A1* | 3/2020 | Velasco | G06N 3/048 |
| 2020/0125639 | A1 | 4/2020 | Doyle | |
| 2020/0184151 | A1 | 6/2020 | Ekmekci | |
| 2021/0118020 | A1* | 4/2021 | Agarwal | G06Q 30/0206 |
| 2021/0224843 | A1* | 7/2021 | Dabas | G06F 16/285 |
| 2023/0245136 | A1 | 8/2023 | Zhu | |

OTHER PUBLICATIONS

Hutto, C. J., et. al. "VADER: A Parsimonious Rule-based Model for Sentiment Analysis of Social Media Text." Proceedings of the Eighth International AAAI Conference on Weblogs and Social Media. vol. 8, No. 1. https://doi.org/10.1609/icwsm.v8i1.14550 (Year: 2014).*

Medhat, W., et. al. "Sentiment analysis algorithms and applications: A survey." Ain Shams Engineering Journal, vol. 5, Iss. 4, pp. 1093-1113, ISSN 2090-4479, https://doi.org/10.1016/j.asej.2014.04.011. (Year: 2014).*

Taboada, M., et. al. "Lexicon-Based Methods for Sentiment Analysis." Computational Linguistics. vol. 37, Iss. 2, pp. 267â307. doi: https://doi.org/10.1162/COLI_a_00049 (Year: 2011).*

Li, J., et. al. "A Machine Learning Approach for the Detection and Characterization of Illicit Drug Dealers on Instagram: Model Evaluation Study" J Med Internet Res. 21(6):e13803. DOI: 10.2196/13803 (Year: 2019).*

Rafea, A., et. al., "Topic extraction in social media," 2013 International Conference on Collaboration Technologies and Systems (CTS), San Diego, CA, USA, pp. 94-98, doi: 10.1109/CTS.2013.6567212. (Year: 2013).*

U.S. Appl. No. 17/589,429, filed Jan. 31, 2022, Jiazhen Zhu.

Amazon Web Services; "What Is Amazon Rekognition?"; https://docs.aws.amazon.com/rekognition/latest/dg/what-is.html; Dec. 4, 2016; 3 pages; retrieved from Internet Archive Wayback Machine https://web.archive.org/web/20161204161247/https://docs.aws.amazon.com/rekognition/latest/dg/what-is.html on May 2, 2022.

Bothra, Deepika; "Escalation Prediction: An Indispensable Part of Modern Customer Support"; https://www.searchunify.com/blog/escalation-prediction-an-indispensable-part-of-modern-customersupport/; Nov. 2, 2020; 5 pages.

Monkey Learn; "Text Analysis, the only guide you'll ever need"; https://monkeylearn.com/text-analysis/; Mar. 14, 2019; 83 pages; retrieved from Internet Archive Wayback Machine https://web.archive.org/web/20190314151618/https://monkeylearn.com/text-analysis/ on May 2, 2022.

Swathi, S., et al.; "Sentiment Analysis of Online Products By Hybrid Feedback Based Recommendation System"; International Journal of Current Research in Life Sciences; Apr. 27, 2018; vol. 07, No. 04; pp. 1918-1922.

Yenala, Harish, et al.; "Deep learning for detecting inappropriate content in text"; Dec. 27, 2017; International Journal of Data Science and Analytics; https://link.springer.com/article/10.1007/s41060-017-0088-4; 14 pages.

Zhu, Jiazhen; "Text Classification: How BERT boost the performance"; https://medium.com/walmartglobaltech/text-classification-how-bert-boost-the-performance-e65d1d678afb; Feb. 18, 2021; 9 pages.

Zhu, Jiazhen;; "Modularization using Python and Docker for Data Pipeline"; https://medium.com/walmartglobaltech/modularization-using-python-and-docker-for-data-pipeline-1193bba7c207; Oct. 26, 2020; 12 pages.

Lee et al., Learning to Pertrub Word Embeddings for Out-of-distribution QA, Proceedings of the 59th Annual Meeting of the Association for Computational Linguistics and the 11th International Joint Conference on Natural Language Processing, pp. 5583-5595 Aug. 1-6, 2021.

USPTO; U.S. Appl. No. 17/589,429; Non-Final Rejection mailed Nov. 27, 2024; (pp. 1-20).

* cited by examiner

SYSTEMS AND METHODS FOR EVENT DETECTION AND RELATION TO CATALOG ITEMS

TECHNICAL FIELD

This invention relates generally evaluating products for commercial sale and more specifically, to using trained neural networks to detect events potentially relevant to products for commercial sale.

BACKGROUND

Generally, a period of time would have passed before a retailer detects that one or more items being sold in its catalog are contrary to the retailer's policy. For example, trending negative political news or news that have negative bent. By this time, several items would have been sold and may subsequently subject the retailer to potential liabilities.

BRIEF DESCRIPTION OF THE DRAWINGS

Disclosed herein are embodiments of systems, apparatuses and methods pertaining to detecting events relative to catalog items available for commercial sale. This description includes drawings, wherein.

Figure 1:
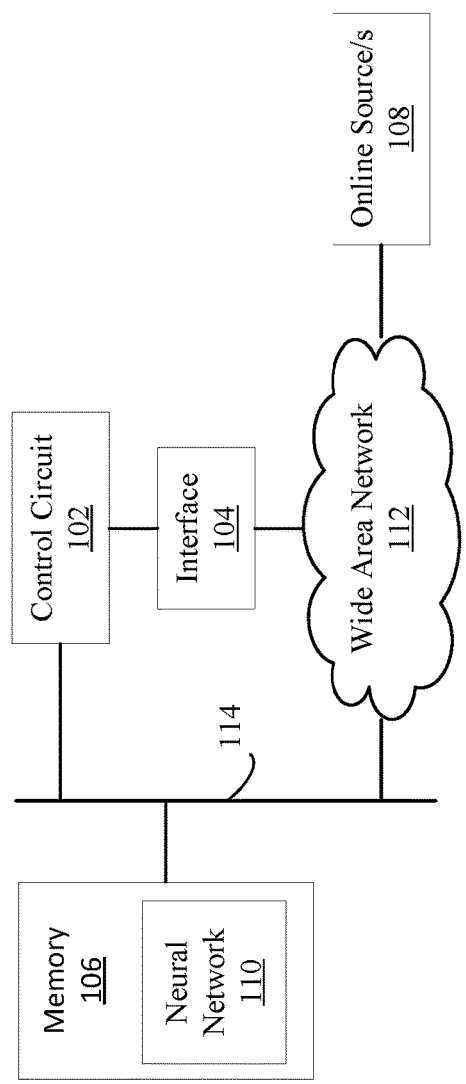
FIG. 1 illustrates a simplified block diagram of an exemplary system for event detection relative to catalog items available for commercial sale in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for event detection relative to catalog items available for commercial sale. In some embodiments, a system for event detection relative to catalog items available for commercial sale includes an interface that couples a first control circuit to one or more online sources via a wide area network. The system may include a memory storing store computer-implemented code comprising a trained neural network. The system includes the first control circuit executing the computer-implemented code to receive event data corresponding to one or more events referred to in one or more online sources. Alternatively or in addition to, the first control circuit executes the computer-implemented code to determine, using the trained neural network, a corresponding score for each of the event data based on a relative level of negativity. Alternatively or in addition to, the first control circuit executes the computer-implemented code to identify, using the trained neural network, one or more topics and key phrases of one or more of the event data having at least a specified score. Alternatively or in addition to, the first control circuit executes the computer-implemented code to identify, using the trained neural network, one or more catalog items available for commercial sale that have a similarity to the one or more topics and key phrases. Alternatively or in addition to, the first control circuit executes the computer-implemented code to output an indication that the one or more catalog items for commercial sale are associated with the one or more topics and key phrases.

In some embodiments, a computer-implemented method for event detection relative to catalog items available for commercial sale includes receiving event data corresponding to one or more events referred to in one or more online sources. Alternatively or in addition to, the computer-implemented method includes determining, using a trained neural network, a corresponding score for each of the event data based on a relative level of negativity. Alternatively or in addition to, the computer-implemented method includes identifying, using the trained neural network, one or more topics and key phrases of one or more of the event data having at least a specified score. Alternatively or in addition to, the computer-implemented method includes identifying, using the trained neural network, one or more catalog items available for commercial sale that have a similarity to the one or more topics and key phrases. Alternatively or in addition to, the computer-implemented method includes outputting an indication that the one or more catalog items for commercial sale are associated with the one or more topics and key phrases.

FIG. 1 illustrates a simplified block diagram of an exemplary system 100 for event detection relative to catalog items available for commercial sale in accordance with some embodiments. The system 100 includes an interface 104 that couples a first control circuit 102 to one or more online sources 108 via a wide area network 112. In some embodiments, the wide area network 112 includes the Internet, intranet and/or any public and/or private communication networks capable of communicatively coupling one electronic device to another one or more electronic devices. For example, an electronic device may include a computer, a server, a cluster, a cloud, and/or a portable user device, to name a few). In some embodiments, the one or more online sources 108 includes a news source, a social media source, and/or a product recall source. It is understood that online sources 108 can include any source communicationally connected to the wide area network 112 and can include web site-based sources, news and/or content aggregators, streaming sources or feeds, for example. In some embodiments, content from the online source 108 may be generated by the provider of the source or may be generated by one or more users of the online source that are independent of the online source. In some embodiments, the system 100 includes a memory 106 storing store computer-implemented code comprising a trained neural network 110. In some embodiments, the memory 106 includes a cloud, a hard drive, a state drive, a storage system, a random access memory, a read only memory, a database, and/or any memory storage devices capable of storing electronic data. By one approach, the memory 106 may be coupled to the first control circuit 102 via the wide area network 112. By another approach, the memory 106 may be coupled to the first control circuit 102 via a local communication network 114 (for example, a local area network (LAN)) or a local communication bus.

In some embodiments, the system 100 includes the first control circuit 102 executing the computer-implemented code to receive event data corresponding to one or more events referred to in one or more online sources 108. In some embodiments, the one or more events include at least one of: a trending news event, a product recall event, a political event, and a social media feed event. Alternatively or in addition to, the first control circuit 102 executes the computer-implemented code to determine, using the trained neural network 110, a corresponding score for each of the event data based on a relative level of negativity. Alternatively or in addition to, the first control circuit 102 executes the computer-implemented code to identify, using the trained neural network 110, one or more topics and key phrases of one or more of the event data having at least a specified score. In some embodiments, the trained neural network 110 identifies the topics and key phrases using a clustering process and a de-duplication process. In some embodiments, a topic of the one or more topics and key phrases corresponds to a corresponding topic of the one or more events. In some embodiments, a key phrase of the one or more topics and key phrases corresponds to a phrase associated with the corresponding topic. In some embodiments, a specified score corresponds to one of a first score value corresponding to at least one of a relative highest level of negativity and a range of score values corresponding to a relative predetermined range of level of negativity. In some embodiments, the trained neural network 110 assigns confidence scores to identified topics and key phrases, and triggers a manual review if a particular confidence score is below a threshold.

Alternatively or in addition to, the first control circuit 102 executes the computer-implemented code to identify, using the trained neural network 110, one or more catalog items available for commercial sale that have a similarity to the one or more topics and key phrases. In some embodiments, the first control circuit 102 executes the computer-implemented code to determine, using the trained neural network 110, the similarity based on an estimated match of the one or more topics and key phrases with descriptions of the one or more catalog items. In some embodiments, the trained neural network 110 assigns a confidence score to the estimated match and/or triggers a manual review if the confidence score is below a threshold.

Alternatively or in addition to, the first control circuit 102 executes the computer-implemented code to output an indication that the one or more catalog items for commercial sale are associated with the one or more topics and key phrases. In some embodiments, the indication comprises at least one of: a message sent to an electronic device associated with a user and a rule that facilitates automatic removal of the identified one or more catalog items from a catalog. For example, a rule may include a code and/or a configuration file used by the first control circuit 102 and/or a second control circuit (not shown) to initiate a search of those catalog items identified as having a similarity to those one or more topics and key phrases having at least a specified score.

Figure 2:
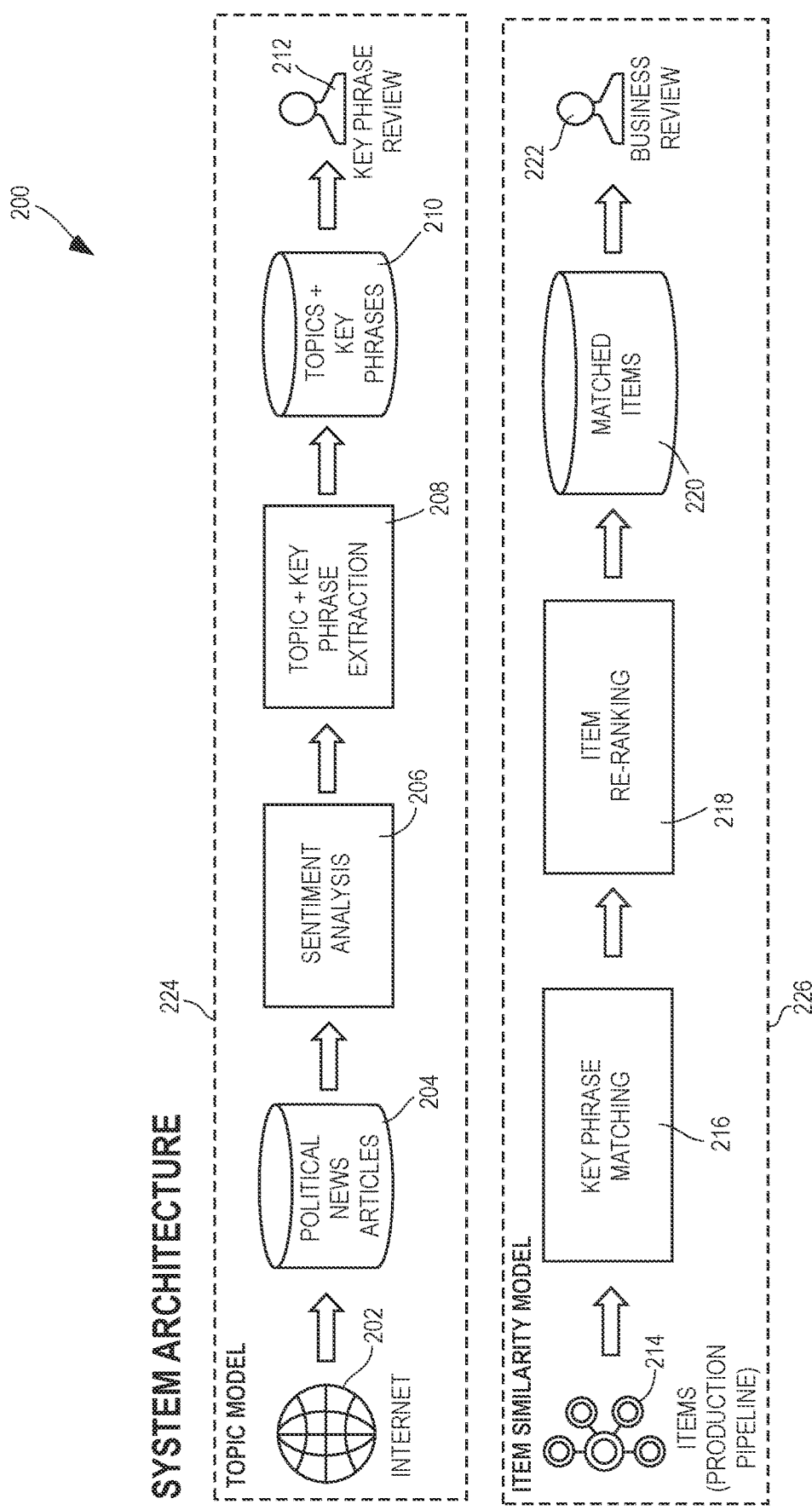
FIG. 2 is an example system architecture for event detection relative to catalog items available for commercial sale in accordance with some embodiments.
Figure 3:
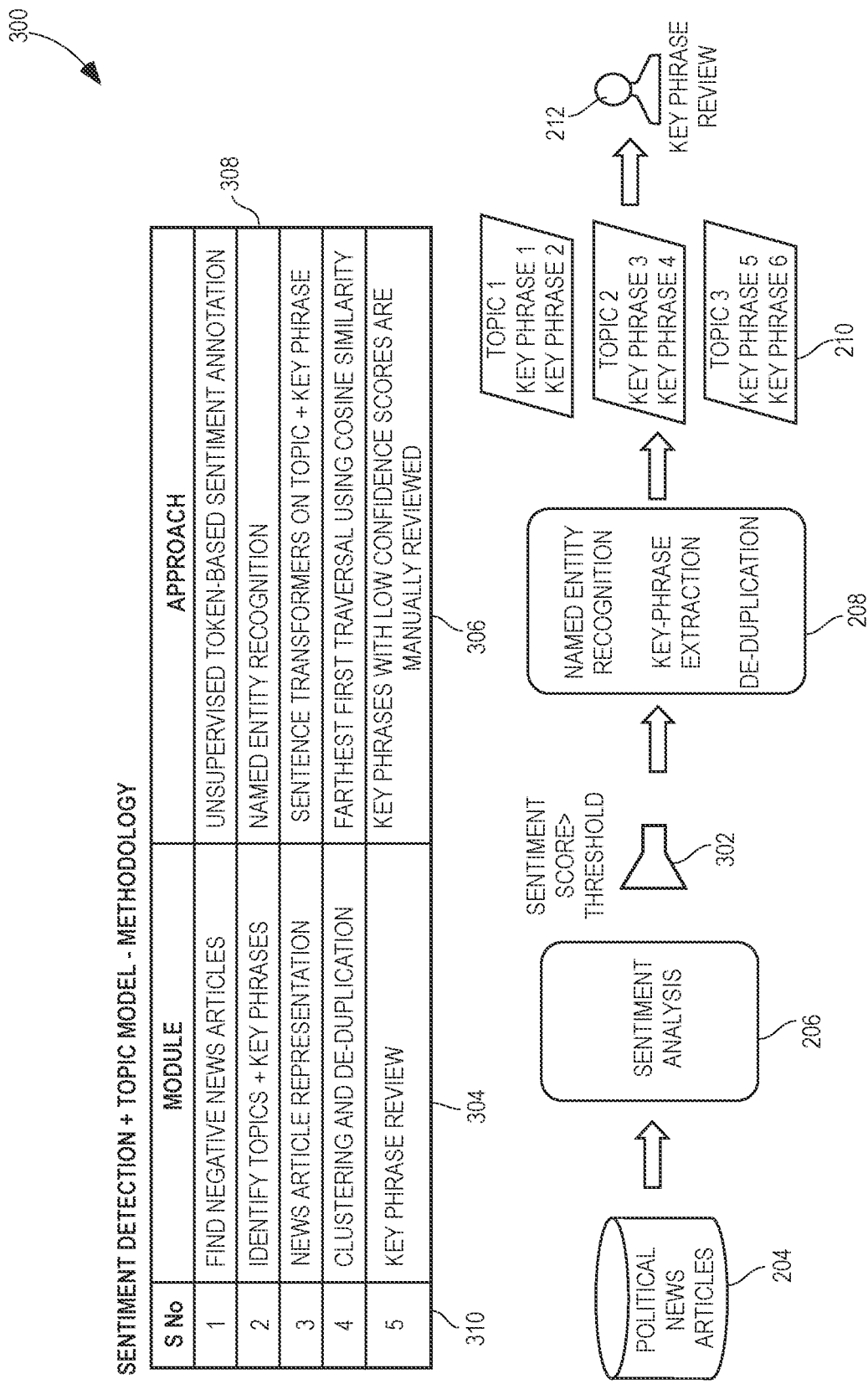
FIG. 3 is an example methodology for event detection relative to catalog items available for commercial sale in accordance with some embodiments.
Figure 4:
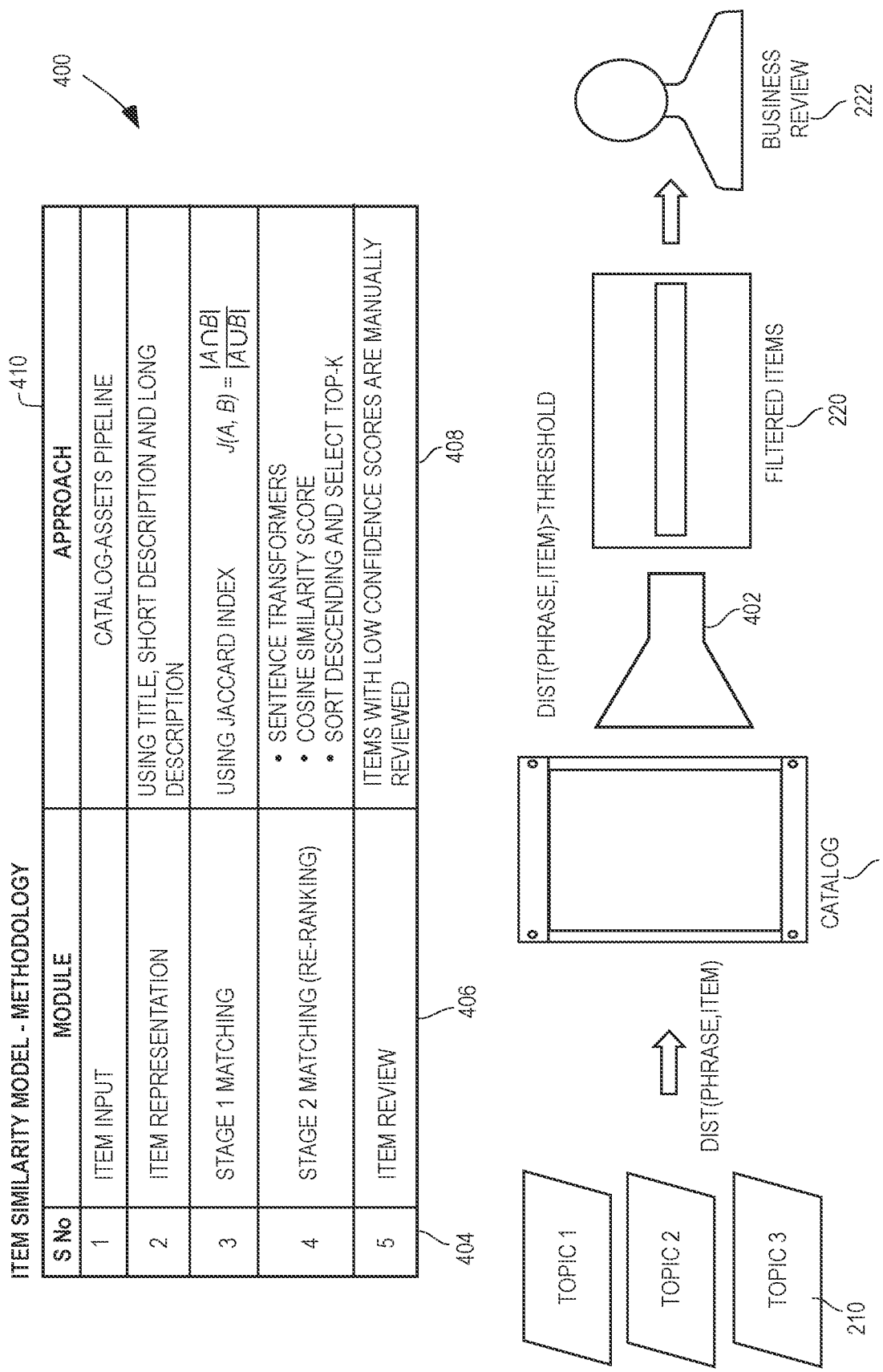
FIG. 4 is an example methodology for event detection relative to catalog items available for commercial sale in accordance with some embodiments.
Figure 5:
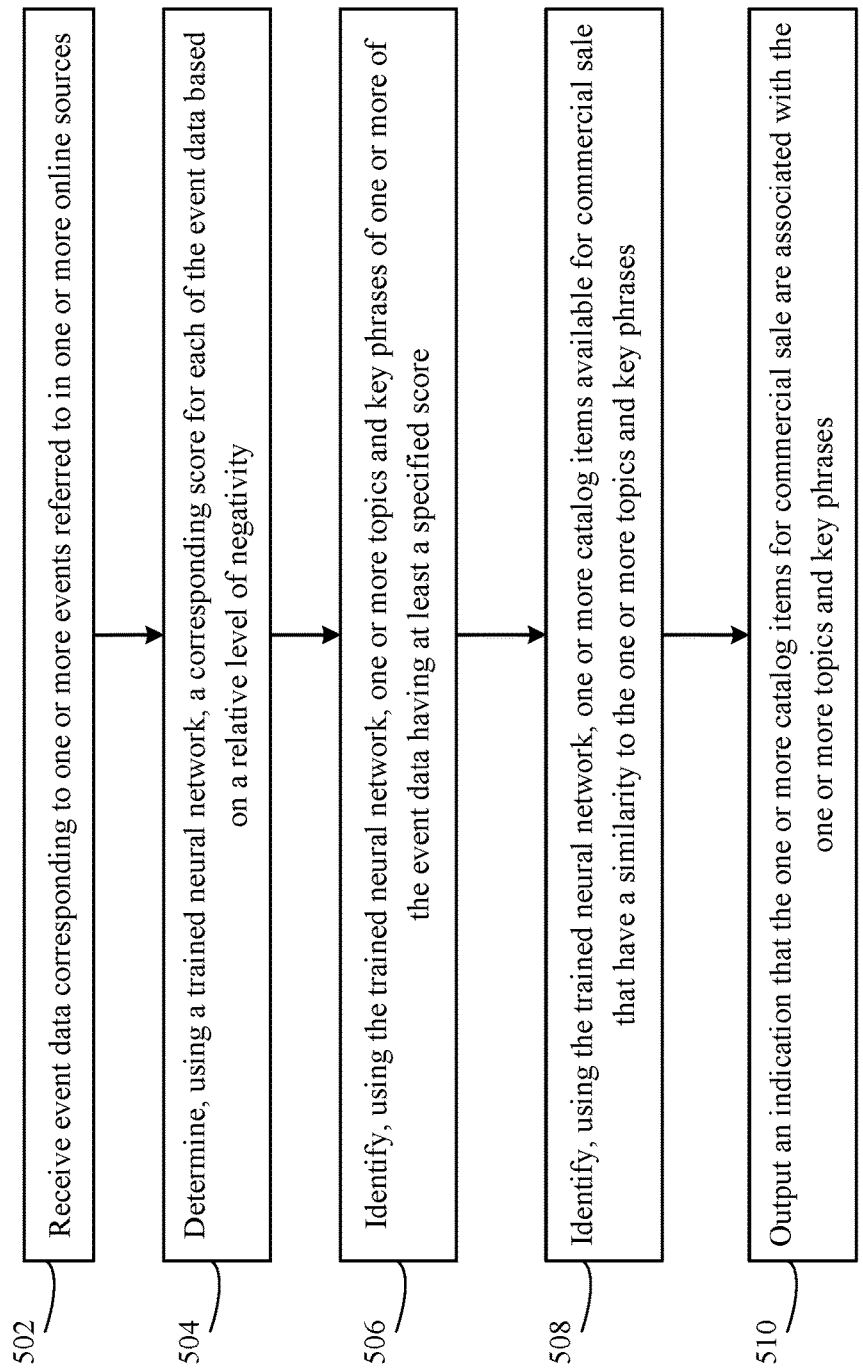
FIG. 5 shows a flow diagram of an exemplary process for event detection relative to catalog items available for commercial sale in accordance with some embodiments.

In illustrative non-limiting examples, FIGS. 2-5 are concurrently explained with reference to one or more elements in FIG. 1. FIG. 2 is an example system architecture 200 for event detection relative to catalog items available for commercial sale in accordance with some embodiments. FIG. 3 is an example methodology 300 for event detection relative to catalog items available for commercial sale in accordance with some embodiments. FIG. 4 is an example methodology 400 for event detection relative to catalog items available for commercial sale in accordance with some embodiments. FIG. 5 shows a flow diagram of an exemplary process for event detection relative to catalog items available for commercial sale in accordance with some embodiments.

In an illustrative non-limiting example, the first control circuit 102 using a topic model 224 trained to perform a social sentiment analysis 206 to determine context of articles, news, and/or blogs on various online sources 108 and/or to extract 208 one or more topics and/or key phrases from the articles, news, and/or blogs, determines a corresponding score 210 for each of the extracted topics and/or key phrases based on a relative level of negativity. For example, the social sentiment analysis 206 includes a use of natural language processing to analyze social conversations online to determine context as they apply to a topic, brand, and/or theme. As described herein, a reference to a neural network may be interchangeable with a reference to a machine learning. However, a person ordinary skilled in the art would know that a neural network is an advanced application of machine learning and that present disclosures are both applicable to a trained neural network and a trained machine learning. Additionally, in executing a trained neural network and/or a trained machine learning, the first control circuit 102 may be executing and/or using one or more models trained as described herein. Moreover, the neural network and/or the machine learning model and/or algorithm may include a supervised learning, an unsupervised learning and/or reinforcement learning. In some embodiments, the neural network and/or the machine learning model and/or algorithm may include Linear Regression, Support Vector Machine, Naïve Bayes, Logistic Regression, K-Nearest Neighbors (kNN), Decision Trees, Random Forest, Gradient Boosted Decision Trees (GBDT), K-Means Clustering, Hierarchical Clustering, DBSCAN Clustering, and/or Principal Component Analysis (PCA), to name a few.

In an illustrative non-limiting example, at step 502, the first control circuit 102 may initiate searches of the Internet 202 and/or receive event data of negative trending events in an online article and/or a social media feed 204. For example, a negative trending event may be an incident involving a famous person, such as a famous person punching a member of the press. The first control circuit 102 using a trained neural network 110 may determine that the aforementioned event may have a score corresponding to an event that has the highest level of negativity compared to other negative trending events online. In some embodiments, the first control circuit 102 using the trained neural network 110 may, at steps 504 and 506, determine a score for each event data, rank each event data, and/or identify those event data having at least a specified score. By one approach, a specified score may be a particular value. By another approach, a specified score may be a particular range of score values. Continuing the example above, the first control circuit 102 using the trained neural network 110 may identify that the topic is the famous person and/or the key phrases could include "actor name punches you", "actor name knock you out", or "actor name slugfest". In some embodiments, the first control circuit 102 using the trained neural network 110 assigns confidence scores to identified topics and key phrases, and triggers a manual review 212 if a particular confidence score is below a threshold. In some embodiments, the manual review 212 may occur after the neural network 110 (or machine learning model) is trained and/or is in use. Alternatively or in addition to, the output of the manual review 212 may be stored in the memory 106. Alternatively or in addition to, the output of the manual review 212 may be used by and/or input to an item similarity model 226 described herein.

In some embodiments, as shown in FIG. 3, output of the sentiment analysis 206 are assigned a sentiment score 302 by the control circuit 102. For example, the first control circuit 102 using the topic model 224 may extract 208 at least a topic and/or a key phrase from those event data having a corresponding sentiment score that is greater than a threshold value. In some embodiments, the first control circuit 102 using the topic model 224 may perform one or more steps 310 corresponding to particular activity and/or function 304 that the topic model 224 is trained as shown in table 308. In some embodiments, the first control circuit 102 using the topic model 224 may use a corresponding approach 306 to perform a corresponding function 304 as shown in the table 308.

In some embodiments, the first control circuit 102 using an item similarity model 226, may, at step 508, identify one or more catalog items 214 available for commercial sale that have a similarity to the identified one or more topics and key phrases. In some embodiments, the first control circuit 102 using the item similarity model 226 performs key phrase and/or topic matching 216. For example, the first control circuit 102 using the item similarity model 226 may determine a match on the identified one or more of the topics and/or key phrases to one or more words in a description and/or a title associated with the one or more catalog items 214. In some embodiments, the first control circuit 102 using the item similarity model 226 performs item re-ranking 218 and/or outputs and/or identifies those catalog items having an estimated match 220. In some embodiments, the item similarity model 226 is a two-step process. For example, in the first step, the key phrase and/or topic matching 216 casts a wide net to catch as many matching items in the catalog as possible. In the second step, the item re-ranking 218 may rank a number of and/or all the items captured in the first step and/or filter the top ranked items (for example, the top 3, 5, 10 etc. ranked items). As such, this may make the output of an estimated match 220 more targeted and/or fine-tuned for a manual review 222. In some embodiments, the re-ranking 218 is performed using a trained neural network 110 (or a machine learning model). In some embodiments, the first control circuit 102 using the item similarity model 226 assigns a confidence score to the estimated match, and triggers a manual review 222 if the confidence score is below a threshold. In some embodiments, the manual review 222 may occur after the neural network 110 (or machine learning model) is trained and/or is in use. Alternatively or in addition to, the output of the manual review 222 may be stored in the memory 106. Alternatively or in addition to, the output of the manual review 222 may be used to remove items from the catalog that are offensive and/or contrary to the retailer's policy.

In some embodiments, as shown in FIG. 4, subsequent to the first control circuit 102 determining the corresponding score 210 for each of the extracted topics and/or key phrases based on a relative level of negativity, the first control circuit 102 using the item similarity model 226 identifies one or more catalog items 214 available for commercial sale that have a similarity to the one or more topics and key phrases. In some embodiments, the first control circuit 102 using the item similarity model 226 may, at step 510, output an indication that the one or more catalog items 214 for commercial sale are associated with the one or more topics and key phrases. In some embodiments, the first control circuit 102 using the item similarity model 226 assigns a confidence score 402 to an estimated match 220, and triggers a manual review 222 if the confidence score is below a threshold. In some embodiments, the first control circuit 102 using the item similarity model 226 may perform one or more steps 404 corresponding to particular activity and/or function 406 that the item similarity model 226 is trained as shown in table 410. In some embodiments, the first control circuit 102 using the item similarity model 226 may use a corresponding approach 408 to perform a corresponding function 406 as shown in the table 410.

The models described herein are trained by going through the same analysis as described for the execution of the model. The models are trained with multiple sets of data inputs corresponding to known and/or fictitious events with and/or without manual feedback to fine tune the identification/similarity analysis and/or scoring/weighting. Once the models provide consistent analysis with a given confidence level, the trained models are saved for use by the system in real time. Occasionally, the models can be re-trained or training can be supplemented with additional training examples and/or data sets and with user feedback during real time usage. In some embodiments, collected and/or received event data are transformed into one or more formats to facilitate training of the neural network 110. In some embodiments, the neural network 110 may be trained in one or more stages. Each stage may output a particular trained model. In some embodiments, a trained model may be further trained in a subsequent stage based on another data set as input.

Figure 6:
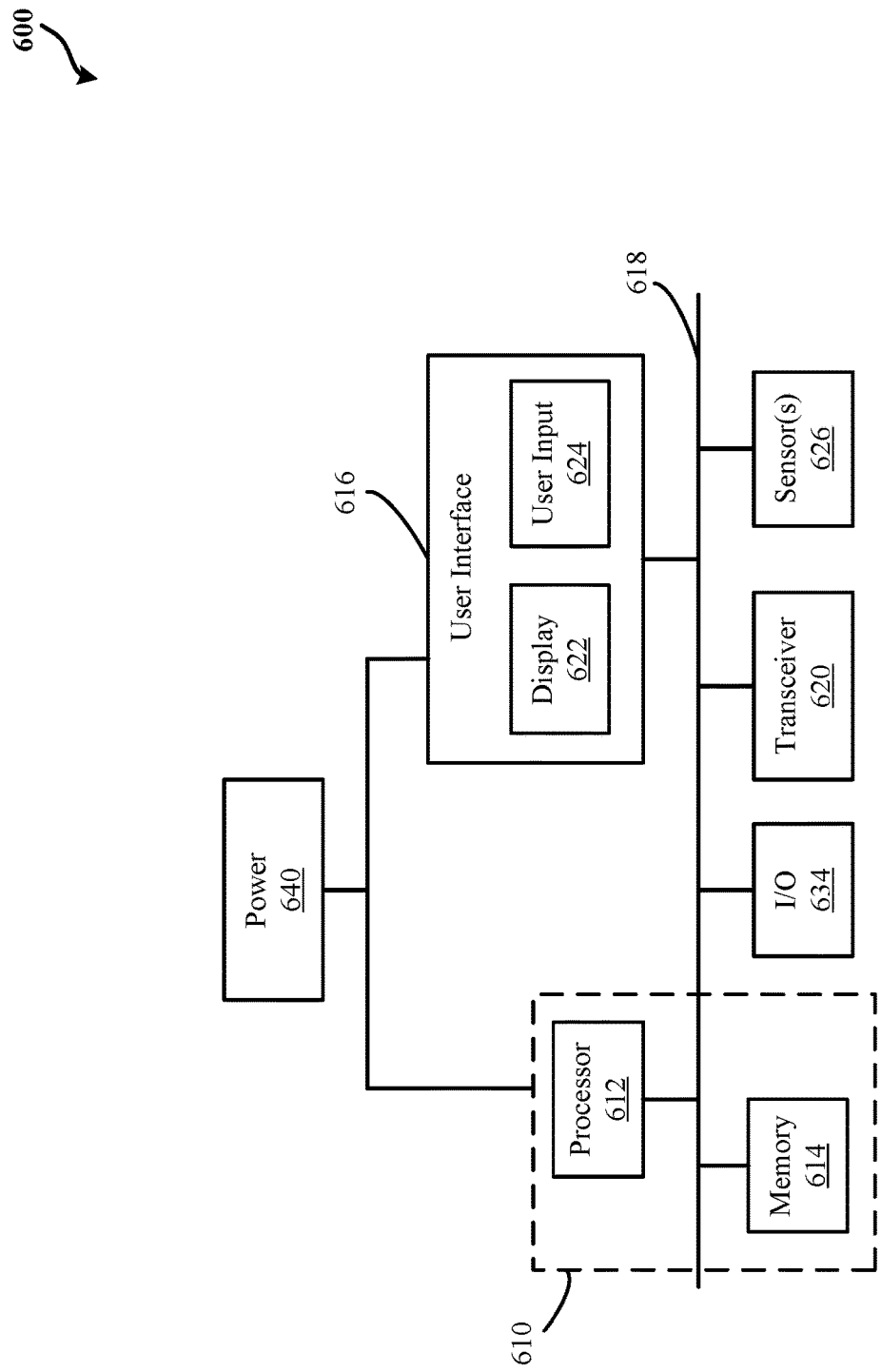
FIG. 6 illustrates an exemplary system for use in implementing methods, techniques, devices, apparatuses, systems, servers, sources and event detection relative to catalog items available for commercial sale, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1, the system architecture 200 of FIG. 2, the methodology 300 of FIG. 3, the methodology 400 FIG. 4, the method 500 of FIG. 5, and/or other above or below mentioned systems or devices, or parts of such circuits, circuitry, functionality, systems, apparatuses, processes, or devices. For example, the system 600 may be used to implement some or all of the system for event detection relative to catalog items available for commercial sale, the first control circuit 102, the interface 104, the memory 106, and/or other such components, circuitry, functionality and/or devices. However, the use of the system 600 or any portion thereof is certainly not required.

By way of example, the system 600 may comprise a processor module (or a control circuit) 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system 600 may implement the system for event detection relative to catalog items available for commercial sale with the control circuit 102 being the control circuit 612.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) interface 634 that allow one or more devices to couple with the system 600. The I/O interface can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for event detection relative to catalog items available for commercial sale, the system comprising:
   an interface to couple a first control circuit to one or more online sources via a wide area network;
   a memory to store computer-implemented code comprising;
   a rule comprising a configuration file to initiate a search, the rule facilitating removal of identified catalog items from a catalog; and
   the first control circuit to execute the computer-implemented code to:
     access event data corresponding to one or more events referred to in the one or more online sources, wherein the one or more events comprises at least one of a trending news event, a product recall event, a political event, or a social media feed event;
     control an execution of a trained neural network topic machine learning model relative to context of the event data to:
       execute unsupervised token-based sentiment annotation relative to levels of negativity of each of the event data and identify a first set of event data, of the event data, that each have a threshold relationship with a sentiment threshold;

extract, through the execution of the topic machine learning model applying de-duplication, a first set of one or more topics and one or more key phrases from the first set of event data;

determine a corresponding score for each of the one or more topics and the one or more key phrases, of the first set of the one or more topics and the one or more key phrases, based on the levels of negativity;

control an execution of a trained neural network item similarity machine learning model to the first set of the one or more topics and the one or more key phrases to:

apply an indexing to the catalog items relative to each of the first set of the one or more topics and the one or more key phrases and identify, through the execution of the item similarity machine learning model, a first set of catalog items, of the catalog items, that each have an index similarity to at least one of the one or more topics and the one or more key phrases of the first set of the one or more topics and the one or more key phrases; and determine, through the execution of the item similarity machine learning model, a cosine similarity score of each of the first set of catalog items, and identify a second set of catalog items, from the first set of catalog items, that each have a cosine similarity score that has a threshold relationship with a similarity score threshold; and automatically remove from the catalog in accordance with the rule each of the catalog items of the second set of catalog items.

2. The system of claim 1, wherein the first control circuit is further configured to execute the computer-implemented code to:

determine, by the item similarity machine learning model, a match on the first set of the one or more of the topics and the one or more key phrases to at least one or more of words in a description and a title associated with a third set of catalog items;

re-rank, by the item similarity machine learning model, the third set of catalog items; and filter, by the item similarity machine learning model, the third set of catalog items according to a ranking, and automatically remove a fourth set of catalog items, of the third set of catalog items, having a threshold ranking.

3. The system of claim 1, wherein the computer-implemented code, when executed, further causes the first control circuit to control the execution of the topic machine learning model to: implement a sentence transform of an initial set of topics and key phrases, and apply a farthest first traversal using cosine similarity to implement a clustering and the de-duplication of the initial set of topics and key phrases in extracting the first set of the one or more topics and the one or more key phrases.

4. The system of claim 3, wherein the computer-implemented code, when executed, further causes the first control circuit to control the execution of the item similarity machine learning model to assign confidence scores to the first set of the one or more topics and the one or more key phrases, and trigger a manual review if a particular confidence score is below a threshold.

5. The system of claim 1, wherein the at least the corresponding score of the one or more topics and the one or more key phrases, of the first set of the one or more topics and the one or more key phrases, corresponds to one of a first score value corresponding to at least one of a relative highest level of negativity and a range of score values corresponding to a relative predetermined range of level levels of negativity.

6. The system of claim 1, wherein the first control circuit further executes the computer-implemented code to determine, using the item similarity machine learning model, the similarity based on an estimated match of the identified one or more topics and key phrases with descriptions of the identified one or more catalog items.

7. The system of claim 6, wherein the item similarity machine learning model assigns a confidence score to the estimated match, and directs a manual review of a third set of one or more topics and/or one or more keywords each having the confidence score below a confidence score threshold.

8. The system of claim 1, wherein the first control circuit further executes the computer-implemented code to output a message to an electronic device associated with a user.

9. The system of claim 1, wherein a first topic of the second set of the one or more topics and the one or more key phrases corresponds to a corresponding topic of a first event of the one or more events, and wherein the first topic comprises a first key phrase phrase associated with the corresponding topic.

10. A computer-implemented method for event detection relative to catalog items available for commercial sale, the computer-implemented method comprising:

controlling an execution of a trained neural network topic machine learning model applied to event data corresponding to one or more events referred to in one or more online sources, wherein the one or more events comprises at least one of a trending news event, a product recall event, a political event, or a social media feed event;

controlling the execution of the topic machine learning model relative to context of the event data to execute unsupervised token-based sentiment annotation relative to levels of negativity of each of the event data and identify a first set event data, of the event data, that each have a threshold relationship with a sentiment threshold;

extracting, through the execution of the topic machine learning model applying de-duplication, a first set of one or more topics and one or more key phrases from the first set of event data, and obtain a corresponding score for each of the one or more topics and the one or more key phrases, of the first set of the one or more topics and the one or more key phrases, based on the levels of negativity;

controlling an execution of a trained neural network item similarity machine learning model to the first set of the one or more topics and the one or more key phrases comprising applying an indexing to the catalog items relative to each of the first set of the one or more topics and the one or more key phrases and identifying, through the execution of the item similarity machine learning model, a first set of catalog items, of the catalog items, that each have an index similarity to at least one of the one or more topics and the one or more key phrases of the first set of the one or more topics and the one or more key phrases;

determining, through the execution of the item similarity machine learning model, a cosine similarity score of each of the first set of catalog items, and identifying a second set of catalog items, from the first set of catalog items, that each have a cosine similarity score that has a threshold relationship with a similarity score threshold;

automatically removing from the catalog in accordance with a rule the each of the catalog items of the second set of catalog items, wherein the rule comprises a configuration file to initiate a search, the rule facilitates removal of identified catalog items from the catalog.

11. The computer-implemented method of claim 10, further comprising:

determining, by the item similarity machine learning model, a match on the first set of the one or more of the topics and the one or more key phrases to at least one or more of words in a description and a title associated with a third set of catalog items;

re-ranking, by the item similarity machine learning model, the third set of catalog items; and filtering, by the item similarity machine learning model, the third set of catalog items according to a ranking; and automatically remove a fourth set of catalog items, of the third set of catalog items. having a threshold ranking.

12. The computer-implemented method of claim 10, further comprising:

controlling the execution of the topic machine learning model implementing a sentence transform of an initial set of topics and key phrases, and applying a farthest first traversal using cosine similarity to implement a clustering and the de-duplication of the initial set of topics and key phrases in extracting the first set of the one or more topics and the one or more key phrases.

13. The computer-implemented method of claim 12, further comprising:

controlling the execution of the item similarity machine learning model assigning confidence scores to the first set of the one or more topics and the one or more key phrases, and triggering, by the item similarity machine learning model, a manual review if a particular confidence score is below a threshold.

14. The computer-implemented method of claim 10, wherein the corresponding score of the one or more topics and the one or more key phrases, of the first set of the one or more topics and the one or more key phrases, corresponds to one of a first score value corresponding to at least one of a relative highest level of negativity and a range of score values corresponding to a relative predetermined range of levels of negativity.

15. The computer-implemented method of claim 10, further comprising determining, by the item similarity machine learning model, the similarity based on an estimated match of the identified one or more topics and key phrases with descriptions of the identified one or more catalog items.

16. The computer-implemented method of claim 15, further comprising:

assigning, using the trained neural network by the item similarity machine learning model, a confidence score to the estimated match; and triggering, by the item similarity machine learning model, a manual review of a third set of one or more topics and/or one or more keywords each having the confidence score below a confidence score threshold.

17. The computer-implemented method of claim 10, further comprising outputting a message to an electronic device associated with a user.

18. The computer-implemented method of claim 10, wherein a first topic of the second set of the one or more topics and the one or more key phrases corresponds to a corresponding topic of a first event of the one or more events, and wherein the first topic comprises a first key phrase.

* * * * *